US012742867B2

(12) United States Patent
Mizutani et al.

(10) Patent No.: US 12,742,867 B2
(45) Date of Patent: Sep. 22, 2026

(54) ULTRASONIC TRANSCEIVER

(71) Applicants: TOYOTA JIDOSHA KABUSHIKI KAISHA, Toyota (JP); Nippon Ceramic Co., Ltd., Tottori (JP)

(72) Inventors: Koichi Mizutani, Susono (JP); Makoto Sakaguchi, Tottori (JP); Ryosuke Kurome, Tottori (JP)

(73) Assignees: TOYOTA JIDOSHA KABUSHIKI KAISHA, Toyota (JP); Nippon Ceramic Co., Ltd., Tottori (JP)

( * ) Notice: Subject to any disclaimer, the term of this patent is extended or adjusted under 35 U.S.C. 154(b) by 149 days.

(21) Appl. No.: 18/856,742

(22) PCT Filed: Apr. 14, 2023

(86) PCT No.: PCT/JP2023/015164

§ 371 (c)(1),
(2) Date: Dec. 2, 2024

(87) PCT Pub. No.: WO2023/200003

PCT Pub. Date: Oct. 19, 2023

(65) Prior Publication Data

US 2025/0264592 A1 Aug. 21, 2025

(30) Foreign Application Priority Data

Apr. 15, 2022 (JP) ................................ 2022-067891

(51) Int. Cl.
*G01S 7/521* (2006.01)
*G01S 15/931* (2020.01)

(52) U.S. Cl.
CPC ........... *G01S 7/521* (2013.01); *G01S 15/931* (2013.01); *G01S 2015/932* (2013.01); *G01S 2015/937* (2013.01)

(58) Field of Classification Search
CPC ............... G01S 7/521; G01S 2015/932; G01S 2015/937; G01S 15/931; B60R 11/02;
(Continued)

(56) References Cited

U.S. PATENT DOCUMENTS

2005/0236938 A1* 10/2005 Nakajima ............. G10K 9/122
310/338
2007/0157731 A1* 7/2007 Okuda ..................... G08G 1/16
73/627

(Continued)

FOREIGN PATENT DOCUMENTS

JP 2005-308639 A 11/2005
JP 2007-112297 A 5/2007

(Continued)

OTHER PUBLICATIONS

Patent Cooperation Treaty, International Search Report, Application No. PCT/JP2023/015164, dated Jul. 11, 2023, in 5 pages.

(Continued)

*Primary Examiner* — Abdallah Abulaban
*Assistant Examiner* — Amie M Bdyre
(74) *Attorney, Agent, or Firm* — PROCOPIO, CORY, HARGREAVES & SAVITCH LLP

(57) ABSTRACT

A coating layer having an anti-ultraviolet effect and impact resistance is provided on a surface of a resin film to form a protective film, and the protective film is bonded to a surface of an ultrasonic sensor, so that it is possible to protect the ultrasonic sensor from an impact caused by a flying stone or the like without impairing the ultrasonic transmission and reception capability of the ultrasonic sensor. By providing a hard coat layer having an anti-ultraviolet effect on a surface of the protective film, it is possible to prevent yellowing caused by ultraviolet rays, and to prevent deterioration of the characteristics of the sensor due to peeling of the protective (Continued)

film. A colored layer is formed by stacking a plurality of layers of ink that is toned to the same color as a vehicle exterior component, thereby ensuring design.

5 Claims, 8 Drawing Sheets

(58) Field of Classification Search
CPC ...... H04R 2499/13; H04R 17/00; H04R 5/04; H04R 3/12; H04S 7/30; H04S 3/002
See application file for complete search history.

(56) References Cited

U.S. PATENT DOCUMENTS

2008/0229830 A1* 9/2008 Matsumoto ............ G01S 7/521 73/584
2008/0232197 A1* 9/2008 Kojima ................ G01S 15/931 367/99
2008/0309201 A1* 12/2008 Ota ....................... G10K 9/122 29/25.35
2009/0195123 A1* 8/2009 Murata ................ G01S 15/931 310/326
2018/0015505 A1* 1/2018 Stevenson ........... H10N 30/853
2019/0242985 A1* 8/2019 Ishii ....................... G01S 7/521
2022/0043147 A1* 2/2022 Satake ................. G01S 15/931
2022/0413137 A1* 12/2022 Tsunoda ................. G01S 7/521

FOREIGN PATENT DOCUMENTS

JP 2008-306315 A 12/2008
JP 2010-154059 A 7/2010
JP 2014-082653 A 5/2014
WO 2021-085598 A1 5/2021

OTHER PUBLICATIONS

Patent Cooperation Treaty, WOSA, Application No. PCT/JP2023/015164, dated Jul. 11, 2023, in 3 pages.

* cited by examiner

ULTRASONIC TRANSCEIVER

CROSS-REFERENCE TO RELATED APPLICATIONS

This application is a US National Stage of International Patent Application PCT/JP2023/015164, filed on Apr. 14, 2023, which claims benefit of priority from Japanese Patent Application JP 2022-067891, filed on Apr. 15, 2022, the contents of both of which are incorporated herein by reference.

TECHNICAL FIELD

The present invention relates to an aerial ultrasonic sensor in which a piezoelectric element is bonded to a bottomed cylindrical case.

BACKGROUND ART

A safety device is widely used in which a range finder unit using an ultrasonic sensor is assembled into a vehicle and a driver is notified of a risk of collision when an object approaches the vehicle. In particular, a safety device that uses a range finder unit to detect an object behind a vehicle when the vehicle moves backward and notify a driver of the approach of the object is often used (see, for example, Patent Literature 1).

Specifically, a safety device that uses a buzzer to notify a driver of approach of an object and a brake-linked safety device that applies a brake to prevent a vehicle from starting when there is an obstacle in front of the vehicle have been invented.

In the distance measurement unit using the ultrasonic sensor used here, a drip-proof ultrasonic sensor is mainly used. The drip-proof ultrasonic sensor is introduced, for example, in Patent Literature 2 (in the document, the drip-proof ultrasonic sensor is referred to as a drip-proof ultrasonic transceiver). The drip-proof ultrasonic sensor has a structure in which a piezoelectric element having electrodes on both surfaces is bonded to a bottom surface of a bottomed cylindrical case, a terminal electrically connected to each electrode of the piezoelectric element is taken out to the outside, and an upper portion of the piezoelectric element is covered with a sponge-like or felt-like sound absorbing material and then sealed with an elastic filler such as silicone rubber. A back surface of an opening side of the bottomed cylindrical case is completely covered with a filler such as silicone rubber, so that liquids do not penetrate inside. Because of the above structure, the electrodes of the piezoelectric element do not short circuit with each other inside the ultrasonic sensor, so that the ultrasonic sensor can be used outdoors where the ultrasonic sensor may be exposed to liquids. A surface of the above ultrasonic sensor that is mounted on a vehicle and transmits and receives ultrasonic waves is coated to match an exterior color of the vehicle to improve design, but a coating strength is low, so that scratches may occur on the surface of the ultrasonic sensor due to flying stones or the like in a market, and when corrosion progresses from the surface or the surface is dented, the internal piezoelectric element provided therein cracks, and the sensor will no longer function. In addition, in a coating method, it is difficult to eliminate a defect caused by adhesion of a foreign substance during manufacture or a defect caused by a scratch, and there is a problem that a coating film rises in a ring shape around an outer periphery of a design surface of the ultrasonic sensor, which can lead to poor appearance. Further, there is a problem that when the sensor is mounted on a vehicle, directivity of the ultrasonic transmission changes due to the adhesion of raindrops or snow, which may cause malfunction. On the other hand, as shown in Patent Literature 3, it is considered that a resin film is attached to the surface to protect the surface of the ultrasonic sensor and prevent scratches and dents, but there is a problem that a sound pressure and sensitivity of the ultrasonic sensor are impaired. In addition, the coating applied to the above ultrasonic sensor also has problems such as fading when exposed to ultraviolet rays in the market, and being vulnerable to liquids such as gasoline and kerosene, as well as acids and alkalis.

CITATION LIST

Patent Literature

Patent Literature 1: JP2007-112297A
Patent Literature 2: JP2010-154059A
Patent Literature 3: JP2005-308639A

SUMMARY OF INVENTION

Technical Problem

In a related-art ultrasonic sensor, a design surface of a bottomed cylindrical case is exposed when the sensor is attached to a bumper of a vehicle or the like, and ultrasonic waves are transmitted and received. When an impact due to a flying stone or the like is applied to the design surface of the sensor while the vehicle is traveling, there is a problem that a dent is generated on a vibration surface and a piezoelectric element inside the sensor is damaged, and thus the ultrasonic sensor is brought into an operation failure. In order to prevent this problem, it is considered that a protective film is attached to the design surface, but in the sensor in the related art, when the protective film is attached to the design surface of the sensor, the ultrasonic transmission and reception capability of the ultrasonic sensor is reduced, and it is difficult to establish a balance between impact resistance and sensor performance. In addition, in the related-art ultrasonic sensor, when a transparent protective film is attached, the film yellows due to ultraviolet rays or heat, resulting in poor appearance. In the related-art ultrasonic sensor, the film is peeled off due to deterioration of adhesion between the protective film and a sensor coating surface, and the ultrasonic waves may be reflected in the gap, resulting in a deterioration in reverberation performance, leading to system malfunction. When the surface of the sensor is colored in the same color as the vehicle, in a coating method, it is difficult to eliminate a defect caused by adhesion of a foreign substance during manufacture or a defect caused by a scratch, and there is a problem that a coating film rises in a ring shape around an outer periphery of the design surface of the ultrasonic sensor, so that appearance is poor. Further, there is a problem that when the sensor is mounted on a vehicle, directivity of the ultrasonic transmission changes due to the adhesion of raindrops or snow, which may cause malfunction. The coating applied to the above ultrasonic sensor also has a problem of being vulnerable to liquids such as gasoline and kerosene, as well as acids and alkalis.

In an ultrasonic sensor including a bottomed cylindrical case including a bottom portion and a cylindrical portion, and a piezoelectric element bonded to an inner bottom surface of the bottomed cylindrical case, a coating layer having an anti-ultraviolet effect and impact resistance and a film thickness of 5 μm to 20 μm is provided on a surface of a resin film having a physical property of a tensile modulus of elasticity of 2.0 GPa or more and a film thickness of 30 μm to 115 μm to form a protective film, and the protective film is bonded to a surface of the bottomed cylindrical case, so that a design surface and an internal structure of the ultrasonic sensor can be protected from an impact from a flying stone or the like without impairing a sound pressure and sensitivity characteristics of the ultrasonic sensor. By providing a hard coat layer having an anti-ultraviolet effect on a surface of the protective film, it is possible to prevent yellowing caused by ultraviolet rays, which can lead to poor appearance, and to prevent the characteristics of the ultrasonic sensor from deteriorating due to film peeling caused by deterioration of the adhesion between the protective film and a sensor coating surface. In coloring to ensure design, an ink toned to the same color as a vehicle exterior component is applied by a printing method or the like to keep a thickness of the colored layer to 10 μm or less, and a plurality of colored layers are stacked to achieve a predetermined color tone while preventing a variation in total thickness of the colored layers, thereby further stabilizing performance of the ultrasonic sensor. In the above ultrasonic sensor, the protective film bonded to the bottomed cylindrical case covers the bottomed cylindrical case continuously from a design surface to a side surface of the bottomed cylindrical case, so that it is possible to achieve both protection and improved design, while solving a problem that a coating film rises in a ring shape around an outer periphery of the design surface of the ultrasonic sensor, which can lead to poor appearance, and a problem of being vulnerable to liquids such as gasoline and kerosene, as well as acids and alkalis. When the coating layer or the resin film layer of the above protective film is subjected to texture processing or the like to form a matte embossed texture, the appearance can be improved by eliminating a difference in appearance with a matte black resin component used in a grille portion of the vehicle. Further, by applying a water-repellent coating to the surface of the protective film, a problem of malfunction caused by a change in ultrasonic directivity due to the adhesion of raindrops or snow when the sensor is mounted on the vehicle can be solved.

DESCRIPTION OF EMBODIMENTS

Embodiment 1

Structure of Ultrasonic Sensor According to Related Art

Figure 4:
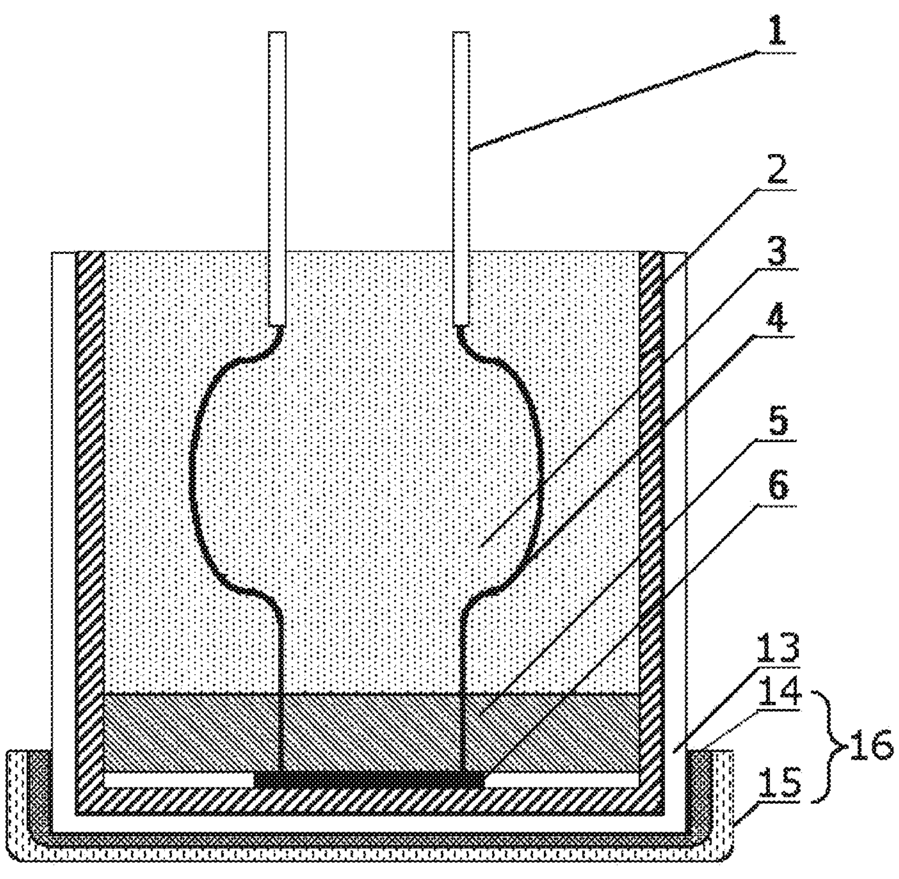
FIG. 4 is a structural diagram showing an example of a related-art ultrasonic sensor.

FIG. 4 is an example of a structural diagram of a related-art ultrasonic sensor. In a configuration of the related-art ultrasonic sensor, a piezoelectric element 6 including a PZT-based ceramic and a folded electrode is bonded to an inner bottom surface of a bottomed cylindrical case 2 made of an aluminum alloy, a sponge 5 formed on the piezoelectric element 6 is disposed, a lead wire 4 is electrically connected to each electrode on the piezoelectric element 6 and a corresponding terminal of a pin terminal 1 by soldering, and an opening side inside the bottomed cylindrical case 2 is sealed by filling an elastic body 3 made of non-porous silicone resin.

(Structure of Ultrasonic Sensor According to Present Invention)

Figure 1:
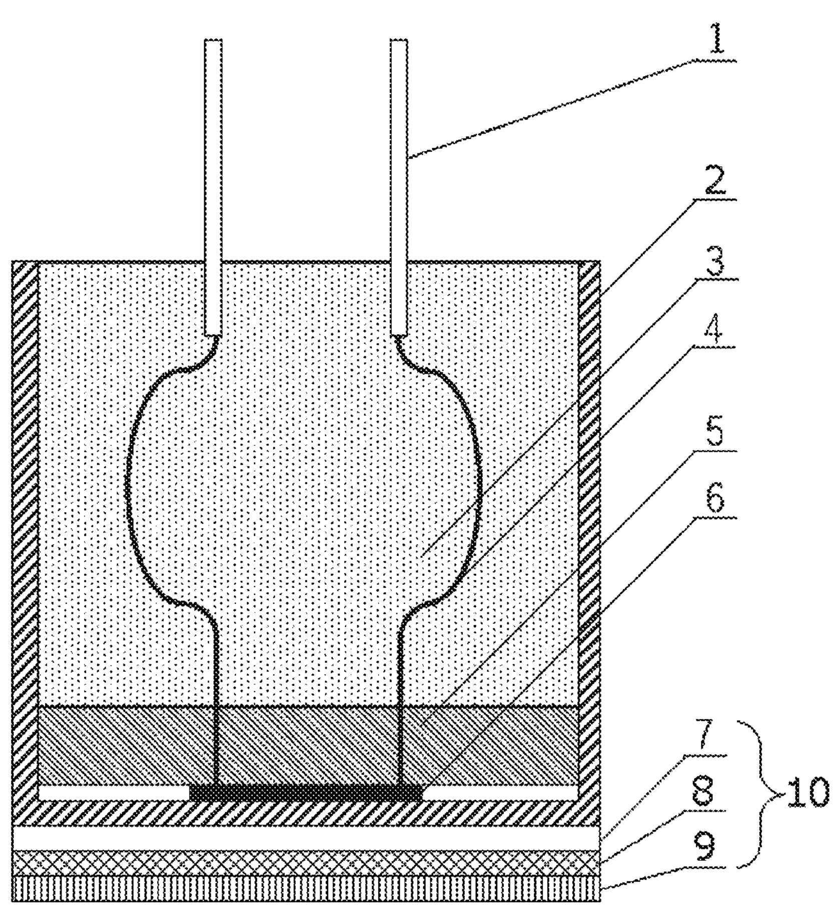
FIG. 1 is a structural diagram showing one side of an ultrasonic sensor according to the present invention.
Figure 2:
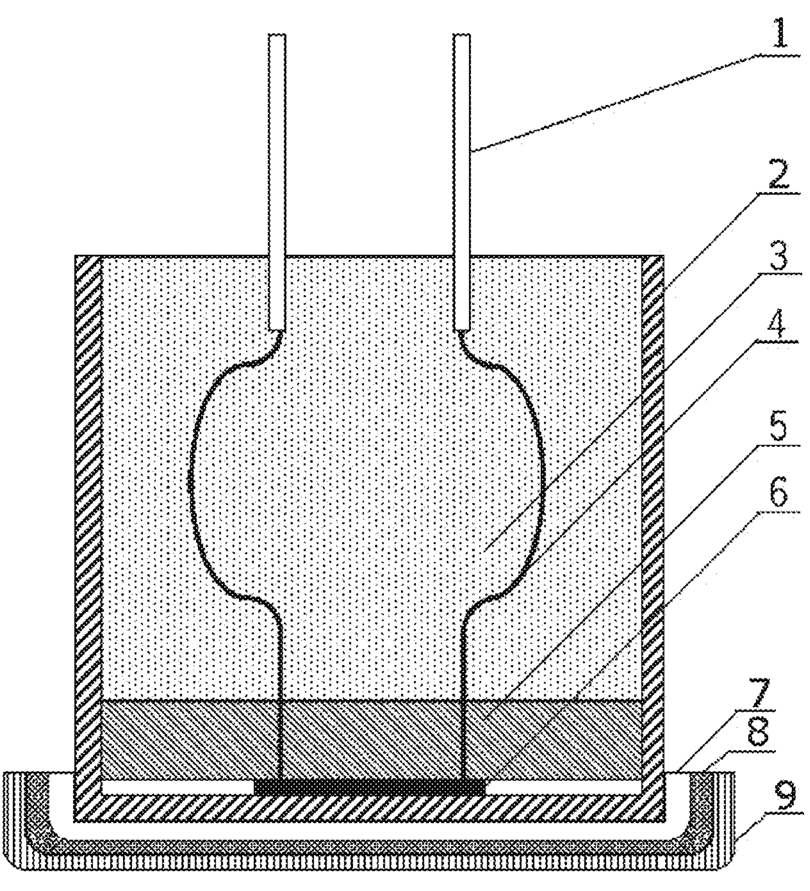
FIG. 2 is a structural diagram showing one side of an ultrasonic sensor according to the present invention.
Figure 3:
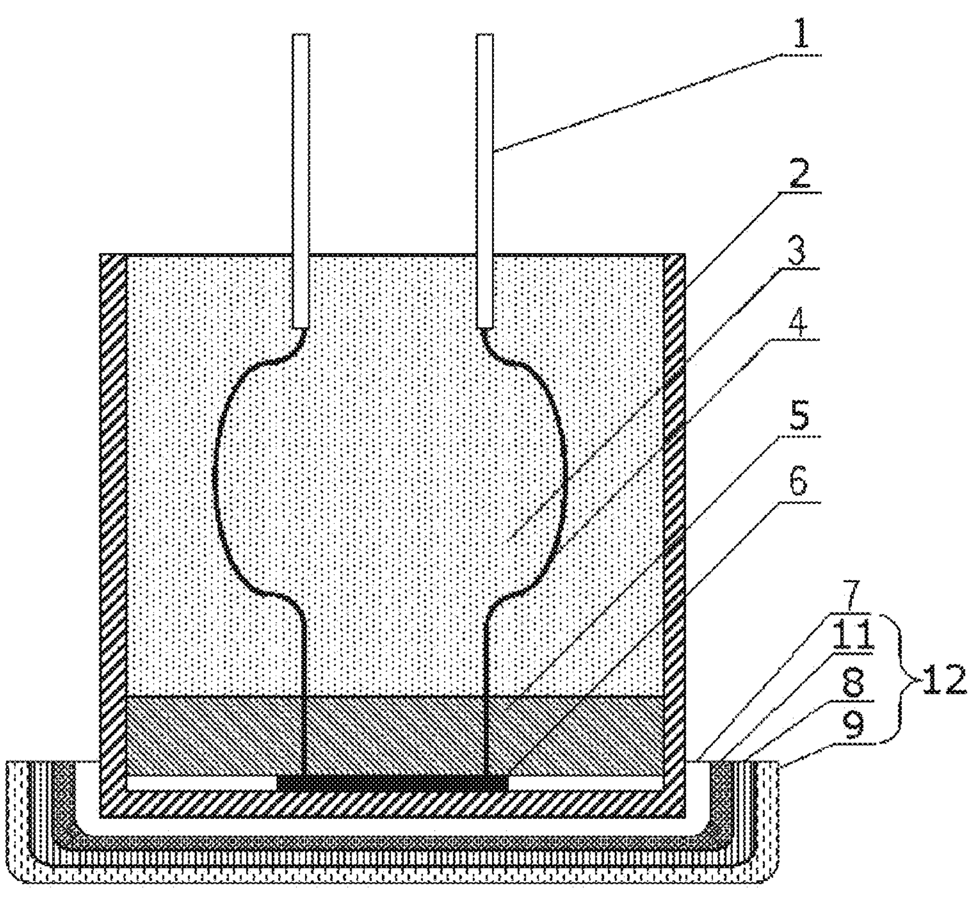
FIG. 3 is a structural diagram showing one side of an ultrasonic sensor according to the present invention.

FIG. 1 is a structural diagram showing one side of an ultrasonic sensor according to the present invention. A structure of the ultrasonic sensor is the same as the structure of the related-art ultrasonic sensor shown in FIG. 4. In the ultrasonic sensor according to an embodiment for implementing an illustrative aspect of the present invention, a resin film 8 provided with a hard coat layer 9 is bonded to a surface of the bottomed cylindrical case 2 using an adhesive. In this case, polyethylene terephthalate is used as a material for the resin film 8, and an acrylic material having an anti-ultraviolet effect and impact resistance is used as a material for the hard coat layer 9. An epoxy adhesive is used to bond a protective film A 10 and the bottomed cylindrical case 2. FIG. 2 is a structural diagram showing one side of an ultrasonic sensor according to the present invention. In the ultrasonic sensor according to an embodiment for implementing another illustrative aspect of the present invention, a size of the protective film A 10 shown in FIG. 1 is processed to be larger than a bottom surface of the bottomed cylindrical case 2, and the bottomed cylindrical case 2 and the protective film A 10 are loaded into a mold while being heated, and are cured while being pressurized using an epoxy adhesive, and the protective film A 10 is processed to cover the bottomed cylindrical case 2 continuously from a design surface to a side surface of the bottomed cylindrical case 2. FIG. 3 is a structural diagram showing one side of an ultrasonic sensor according to the present invention. In the ultrasonic sensor according to an embodiment for implementing another illustrative aspect of the present invention, a colored layer 11, which is colored using an ink that is toned to the same color as a vehicle exterior component, is printed by screen printing on a surface of a protective film B 12 where the resin film 8 is not bonded to the hard coat layer 9, and the bottomed cylindrical case 2 and the protective film B 12 are bonded to each other via an epoxy adhesive, as in the ultrasonic sensor shown in FIG. 1. The above adhesive does not necessarily have to be an epoxy adhesive, and an acrylic adhesive may be used.

Figure 5:
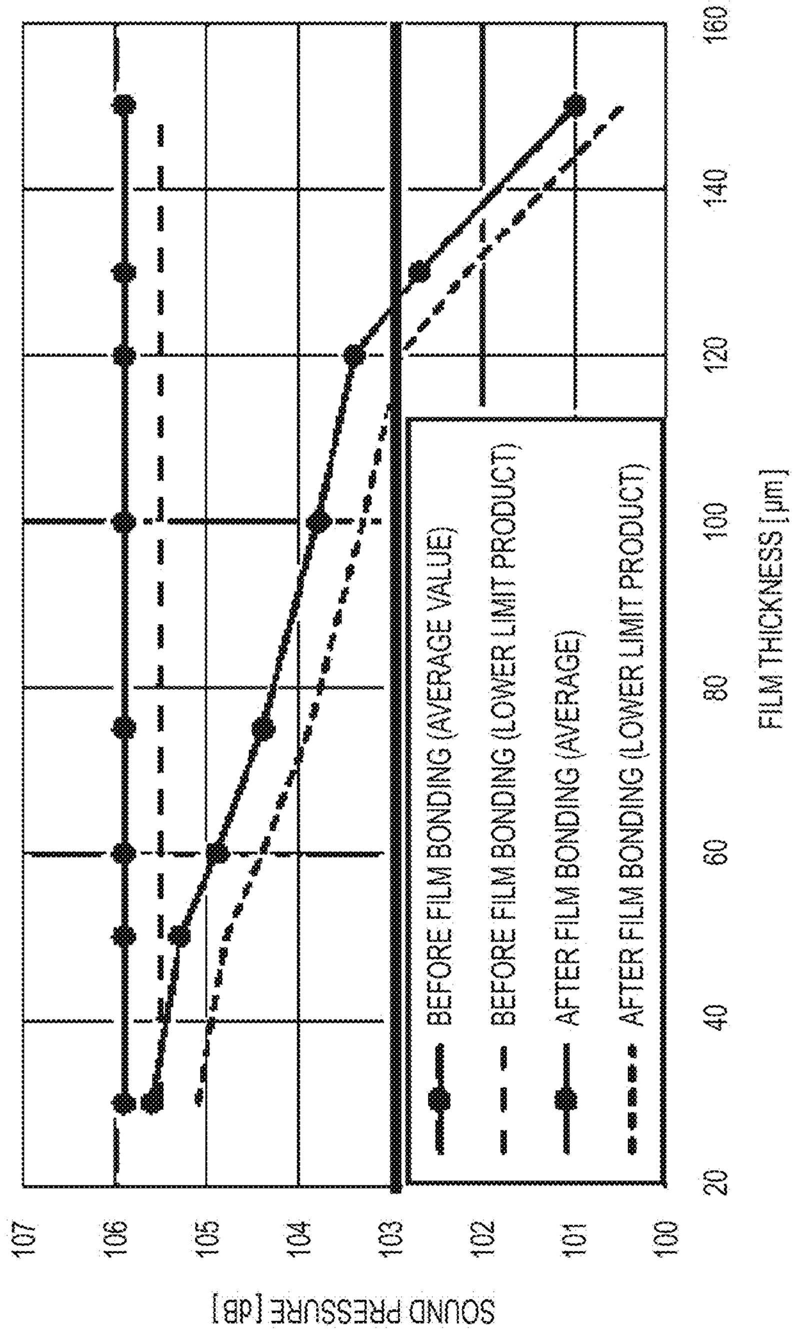
FIG. 5 is a graph showing an example of a thickness of a protective film of the ultrasonic sensor and a sound pressure of the ultrasonic sensor according to the present invention.
Figure 6:
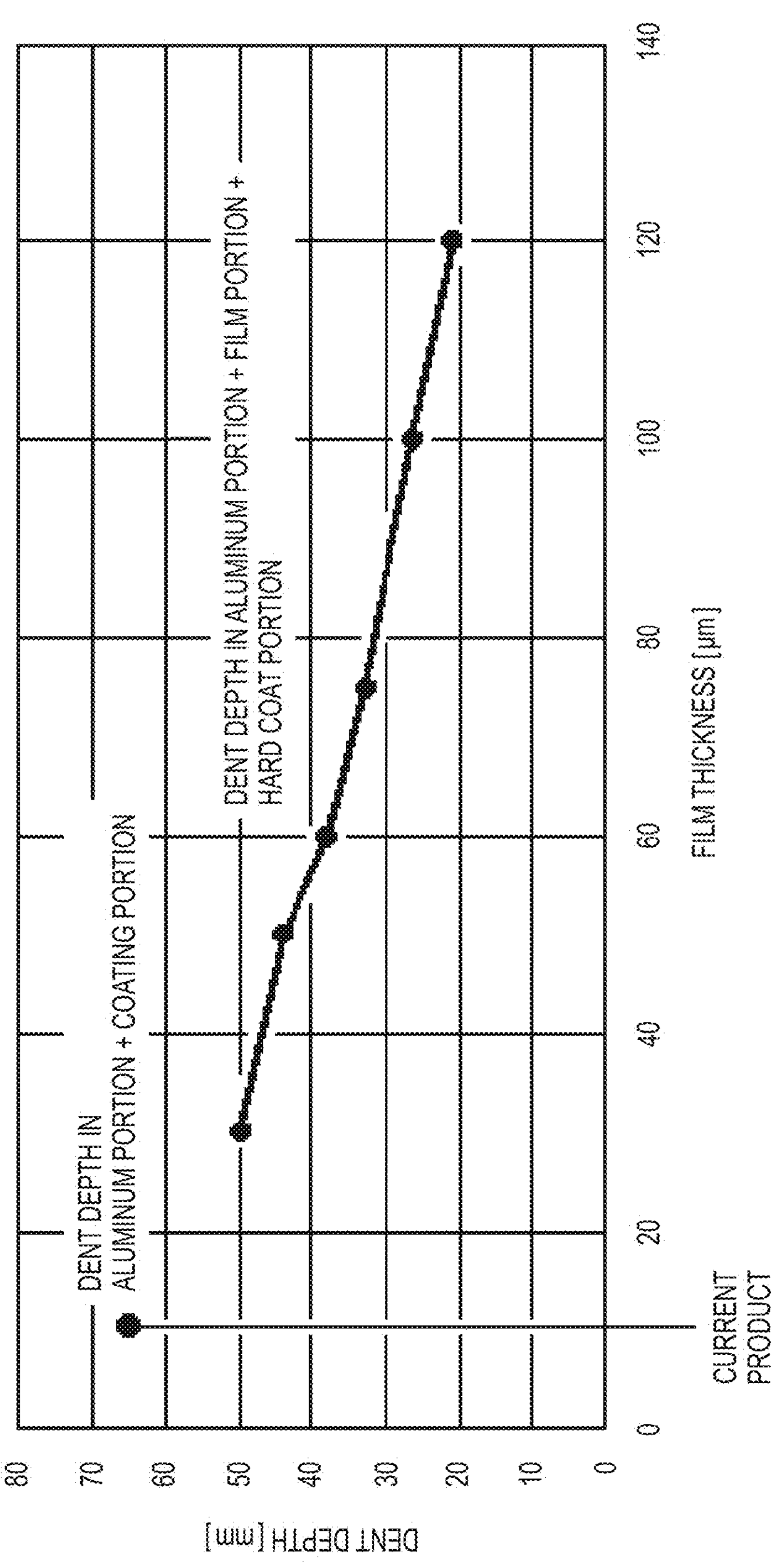
FIG. 6 is a graph showing an example of impact resistance performance (dent depth) in the ultrasonic sensor according to the present invention and the related-art ultrasonic sensor.
Figure 7:
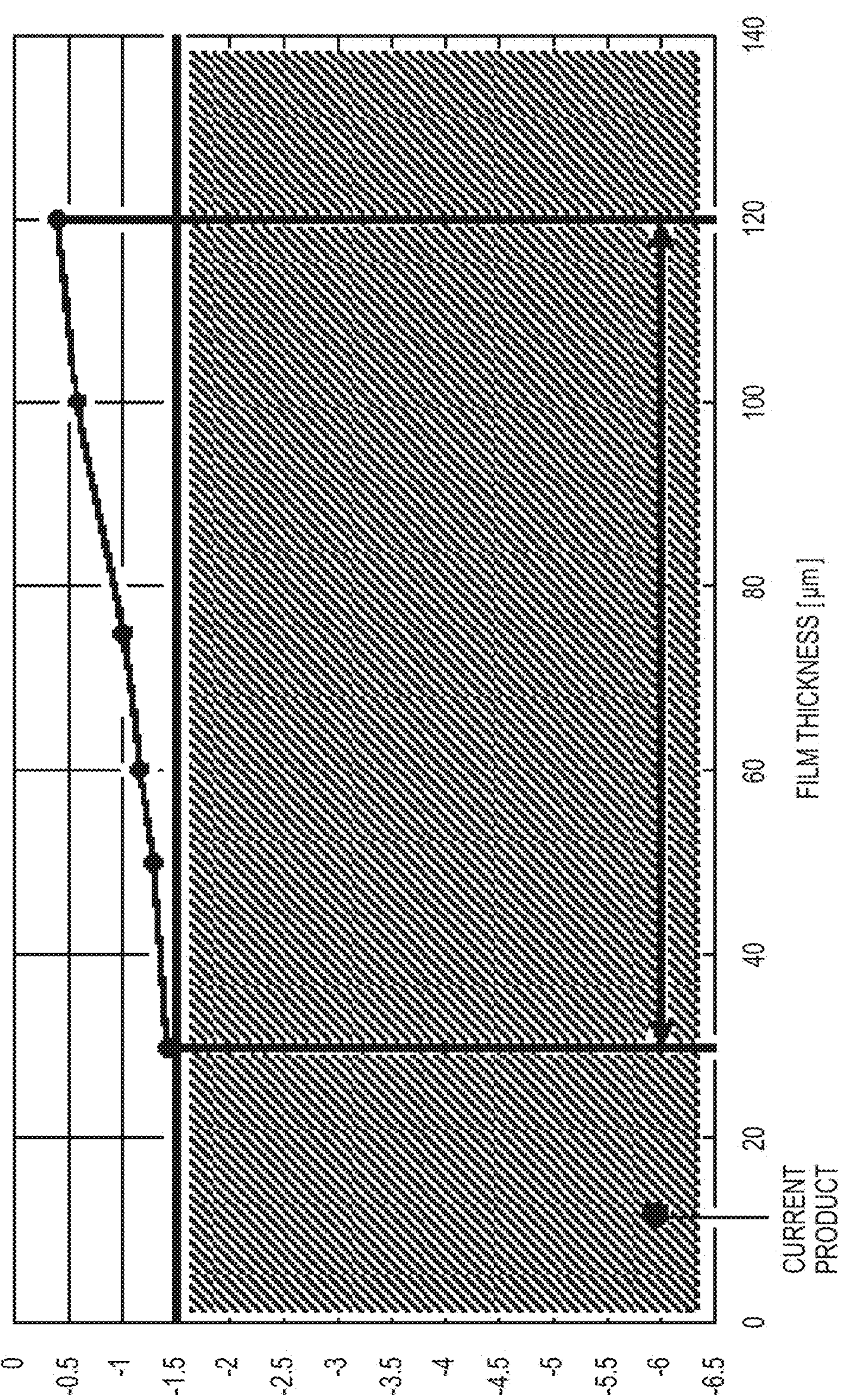
FIG. 7 is a graph showing an example of a thickness of a resin film and a sound pressure after an impact test in the ultrasonic sensor according to the present invention.
Figure 8:
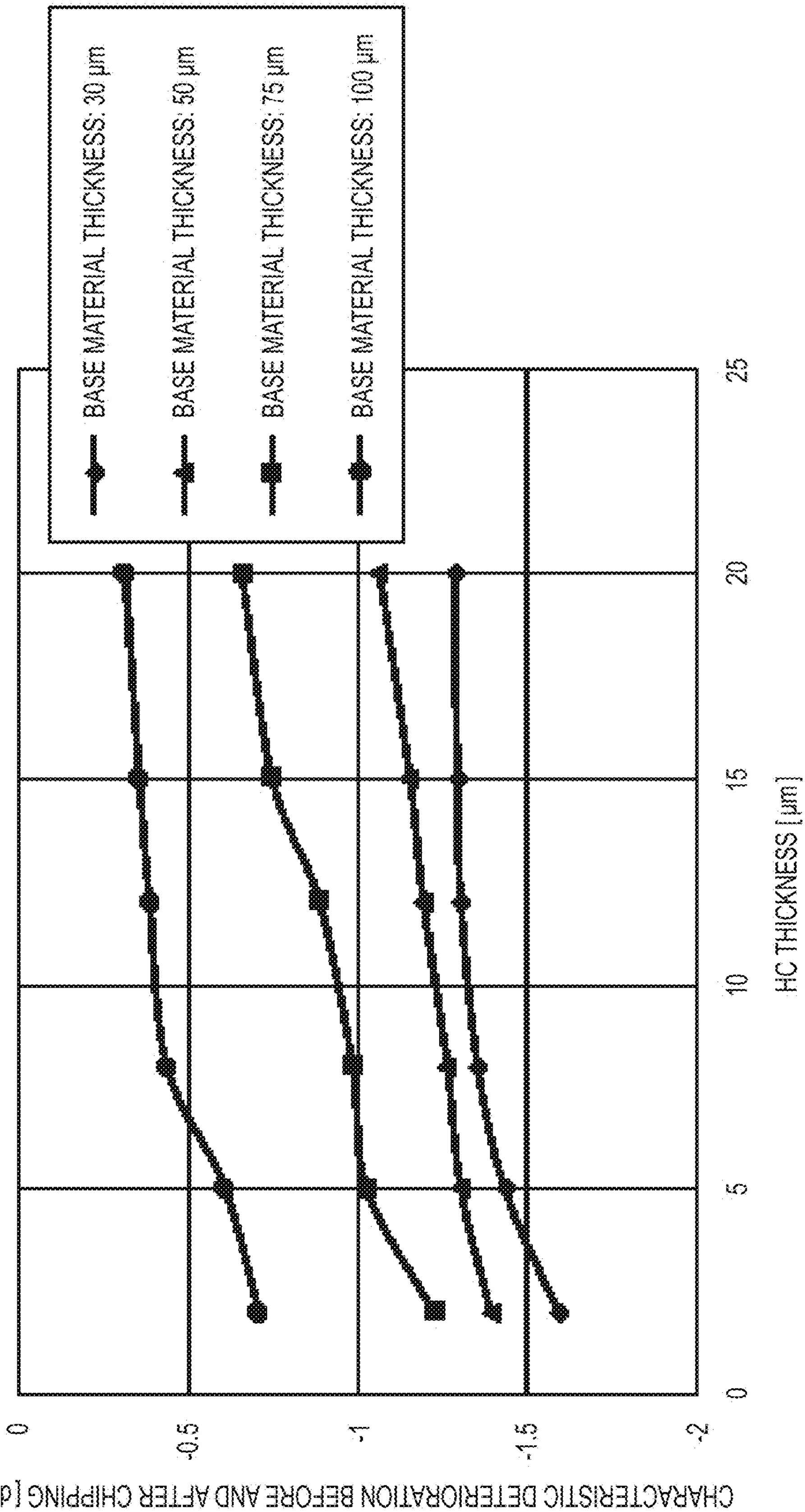
FIG. 8 is a graph showing an example of a thickness of a hard coat layer and the sound pressure after the impact test in the ultrasonic sensor according to the present invention.

FIG. 5 is a graph showing an example of a thickness of the protective film of the ultrasonic sensor and a sound pressure of the ultrasonic sensor according to the present invention. When the thickness of the protective film is in a range of 30 μm to 115 μm, a sound pressure reduction of the ultrasonic sensor after the protective film is bonded to the bottomed cylindrical case can satisfy 103 dB, which is a level that does not cause any performance problems. FIG. 6 is a graph showing an example of impact resistance performance (dent depth) in the ultrasonic sensor according to the present invention and the related-art ultrasonic sensor. In this verification, in the ultrasonic sensor according to the present invention, confirmation is performed by varying a thickness of the resin film between 30 μm and 120 μm. In the related-art ultrasonic sensor, the dent depth after an impact test is 65 μm, but in the ultrasonic sensor according to the present invention, the dent depth is 20 μm to 50 μm when the thickness of the resin film is in the range of 30 μm to 120 μm, and an improvement is observed. FIG. 7 is a graph showing an example of the thickness of the resin film and the sound pressure after the impact test in the ultrasonic sensor according to the present invention. When the confirmation is performed by varying the thickness of the resin film from 30 μm to 120 μm, the sound pressure reduction after the impact resistance test is −6.0 dB in the related-art ultrasonic sensor, whereas the sound pressure reduction of the ultrasonic sensor according to the present invention is greatly improved from −1.4 dB to −0.4 dB. From results shown in FIGS. 5, 6, and 7, the thickness of the protective film is set to 30 μm to 115 μm in consideration of a balance between a sound pressure reduction before and after the protective film is bonded to the bottomed cylindrical case and the sound pressure reduction after the impact resistance test. FIG. 8 is a graph showing an example of a thickness of the hard coat layer and the sound pressure after the impact test in the ultrasonic sensor according to the present invention. In this verification, the sound pressure reduction after the impact test is confirmed by combining and varying the thickness of the resin film between 30 μm and 120 μm and the thickness of the hard coat layer between 2 μm and 20 μm. The combination of the hard coat layer with the thickness of the resin film of 30 μm results in a significant sound pressure reduction after the impact test, so the thickness of the hard coat layer is set to 5 μm to 20 μm, aiming for a sound pressure reduction level of −1.5 dB that satisfies sensor performance.

Here, features of a connector according to the present embodiment described above will be briefly summarized and listed below.

According to a first aspect, an ultrasonic sensor includes: a bottomed cylindrical case (2) including a bottom portion and a cylindrical portion; and a piezoelectric element (6) bonded to an inner bottom surface of the bottomed cylindrical case (2). A coating layer having an anti-ultraviolet effect and impact resistance and a film thickness of 5 μm to 20 μm is provided on a surface of a resin film having a physical property of a tensile modulus of elasticity of 2.0 GPa or more and a film thickness of 30 μm to 115 μm to form a protective film (10, 12), and the protective film is bonded to a surface of the bottomed cylindrical case (2).

According to a second aspect, in the ultrasonic sensor according to the above first aspect, the protective film (10, 12) bonded to the bottomed cylindrical case (2) covers the bottomed cylindrical case (2) continuously from a design surface to a side surface of the bottomed cylindrical case (2), to achieve both protection and appearance.

According to a third aspect, in the ultrasonic sensor according to the above first aspect, the coating layer or the resin film layer of the protective film (10, 12) includes a surface that is subjected to texture processing to form a matte embossed texture such that appearance of a vehicle is improved.

According to a fourth aspect, in the ultrasonic sensor according to the above first or second, a layer colored with an ink toned to the same color as a vehicle exterior component is provided on a back side of the resin film (8) in the protective film (10, 12), and a plurality of colored layers each having a thickness of 10 μm or less are stacked to achieve a predetermined color tone while preventing a variation in total thickness of the colored layers.

According to a fifth aspect, in the ultrasonic sensor according to any one of the above first to third aspects, a water-repellent coating is applied to a surface of the protective film (10, 12).

The present invention has been described in detail with reference to specific embodiments, and it is apparent to those skilled in the art that various changes and modifications can be made without departing from the spirit and scope of the present invention.

The present application is based on Japanese Patent Application No. 2022-067891 filed on Apr. 15, 2022, the contents of which are incorporated herein by reference.

INDUSTRIAL APPLICABILITY

The present invention can be applied not only to a back sensor and a corner sensor for a vehicle and an automatic parking system, but also to various fields in which an ultrasonic sensor is used.

REFERENCE SIGNS LIST

1: pin terminal
2: bottomed cylindrical case made of aluminum alloy
3: elastic body made of non-porous silicone resin
4: lead wire
5: sponge
6: piezoelectric element
7: adhesive layer
8: resin film
9: hard coat layer
10: protective film A
11: colored layer
12: protective film B
13: base coating
14: color base
15: clear
16: top coating

The invention claimed is:

1. An ultrasonic sensor comprising:

a bottomed cylindrical case including a bottom portion and a cylindrical portion; and a piezoelectric element bonded to an inner bottom surface of the bottomed cylindrical case, wherein a coating layer having an anti-ultraviolet effect and impact resistance and a film thickness of 5 μm to 20 μm is provided on a surface of a resin film having a physical property of a tensile modulus of elasticity of 2.0 GPa or more and a film thickness of 30 μm to 115 μm to form a protective film, and the protective film is bonded to a surface of the bottomed cylindrical case.

2. The ultrasonic sensor according to claim 1, wherein the protective film bonded to the bottomed cylindrical case covers the bottomed cylindrical case continuously from a design surface to a side surface of the bottomed cylindrical case, to achieve both protection and appearance.

3. The ultrasonic sensor according to claim 1, wherein the coating layer or the resin film layer of the protective film is subjected to texture processing to form a matte embossed texture such that appearance of a vehicle is improved.

4. The ultrasonic sensor according to claim 1, wherein a layer colored with an ink toned to the same color as a vehicle exterior component is provided on a back side of the resin film in the protective film, and a plurality of colored layers each having a thickness of 10 μm or less are stacked to achieve a predetermined color tone while preventing a variation in total thickness of the colored layers.

5. The ultrasonic sensor according to claim 1, wherein a water-repellent coating is applied to a surface of the protective film.

* * * * *